United States Patent
Cheng

(10) Patent No.: US 7,589,505 B2
(45) Date of Patent: Sep. 15, 2009

(54) POWER SUPPLY WITH RELIABLE VOLTAGE FEEDBACK CONTROL INDEPENDENT OF ANY GROUND VOLTAGE DIFFERENCE

(75) Inventor: Wing Ling Cheng, Taipo (HK)

(73) Assignee: Astec International Limited, Kwun Tong, Kowloon (HK)

( * ) Notice: Subject to any disclaimer, the term of this patent is extended or adjusted under 35 U.S.C. 154(b) by 294 days.

(21) Appl. No.: 11/152,847

(22) Filed: Jun. 14, 2005

(65) Prior Publication Data

US 2006/0290204 A1  Dec. 28, 2006

(51) Int. Cl.
G05F 1/10 (2006.01)
H02J 3/12 (2006.01)

(52) U.S. Cl. ........................ 323/234; 323/281

(58) Field of Classification Search ............... 323/271, 323/273, 274, 281
See application file for complete search history.

(56) References Cited

U.S. PATENT DOCUMENTS

| | | | |
|---|---|---|---|
| 4,906,913 A * | 3/1990 | Stanojevic | 323/303 |
| 5,311,144 A | 5/1994 | Gasset | |
| 5,430,365 A * | 7/1995 | Taylor et al. | 323/273 |
| 5,713,693 A * | 2/1998 | Lindenthal | 403/359.5 |
| 6,121,761 A | 9/2000 | Herbert | |
| 6,472,857 B1 * | 10/2002 | Genest et al. | 323/303 |
| 2002/0021150 A1 | 2/2002 | Tuchiya et al. | |
| 2002/0093318 A1 * | 7/2002 | Wallis | 323/274 |
| 2003/0011247 A1 | 1/2003 | Kajiwara et al. | |
| 2004/0232899 A1 | 11/2004 | Herbert | |

* cited by examiner

*Primary Examiner*—Edward Tso
*Assistant Examiner*—Arun Williams
(74) *Attorney, Agent, or Firm*—Harness, Dickey & Pierce, P.L.C.

(57) ABSTRACT

A power supply having a control circuit for controlling an output of the power supply, and a voltage monitor circuit for detecting a voltage at a first location and providing the detected voltage to a second location in the control circuit independent of any difference in ground voltage between the first location and the second location. The control circuit is configured to control the output of the power supply in response to the detected voltage provided by the voltage monitor circuit.

15 Claims, 3 Drawing Sheets

POWER SUPPLY WITH RELIABLE VOLTAGE FEEDBACK CONTROL INDEPENDENT OF ANY GROUND VOLTAGE DIFFERENCE

FIELD OF THE INVENTION

The present invention relates to electric power supplies including, for example, DC/DC converters and voltage regulation modules (VRMs).

BACKGROUND OF THE INVENTION

A wide variety of electric power supplies are known which employ voltage feedback for control of the power supply, including many DC/DC converters and voltage regulation modules (VRMs). In some cases, the feedback voltage is the power supply output voltage. Accurate feedback of the output voltage is particularly useful when, for example, a constant voltage across a variable load is desired.

As recognized by the inventor hereof, variations in ground voltages internal and/or external to the power supply can result in inaccurate voltage feedback. For example, if a voltage is detected relative to ground at a first location, provided to a control circuit at a second location, and then interpreted by the control circuit relative to ground at the second location, the control circuit will be unable to accurately interpret the detected voltage if the ground voltages at the first and second locations are different. This, in turn, can result in inaccurate control of the power supply.

SUMMARY OF THE INVENTION

The inventor hereof has succeeded at designing power supplies that are capable of detecting a voltage at one location and accurately providing the detected voltage to a second location for control purposes, irrespective of any ground variations that may exist between the first and second locations.

According to one aspect of the invention, a power supply includes a control circuit for controlling an output of the power supply, and a voltage monitor circuit for detecting a voltage at a first location and providing the detected voltage to a second location in the control circuit independent of any difference in ground voltage between the first location and the second location. The control circuit is configured to control the output of the power supply in response to the detected voltage provided by the voltage monitor circuit.

According to another aspect of the invention, a switched current power converter includes at least one source of current, an output, a control circuit, and a voltage monitor circuit for detecting a voltage at the output and providing the detected output voltage to the control circuit independent of any difference in ground voltage between the output and the control circuit. The control circuit is configured to selectively couple the current to the output as a function of the detected output voltage provided by the voltage monitor circuit.

According to yet another aspect of the invention, a power supply includes control means for selectively coupling current to an output of the power supply and voltage monitoring means for detecting a voltage at an output of the power supply and providing the detected output voltage to the control means independent of any difference in ground voltage between the output and the control means.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

Figure 1:
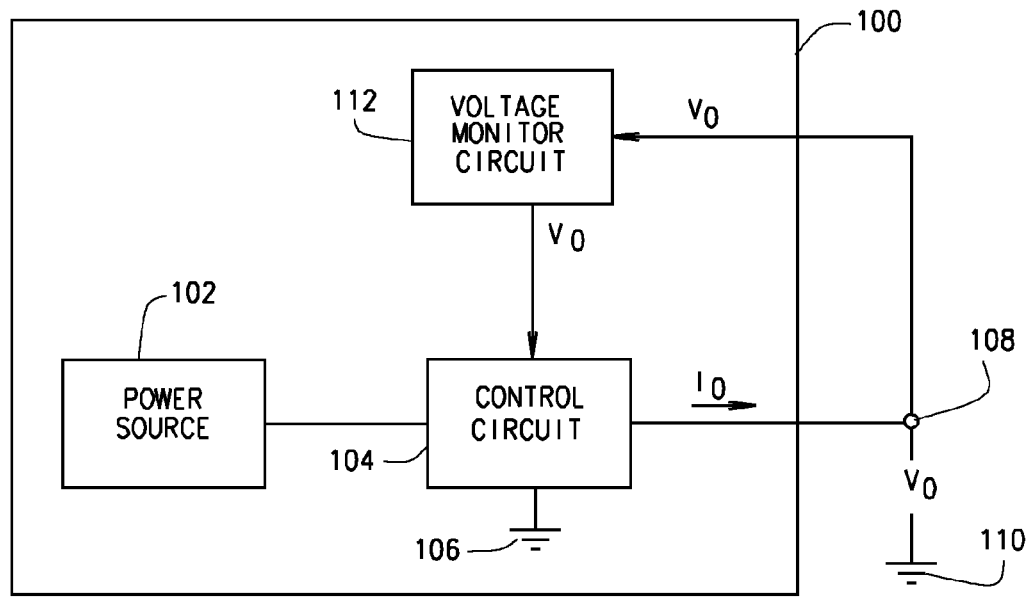
FIG. 1 is a block diagram of a power supply according to one exemplary embodiment of the present invention.

A power supply according to one aspect of the present invention includes a control circuit for controlling an output of the power supply, and a voltage monitor circuit for detecting a voltage at a first location and providing the detected voltage to a second location in the control circuit independent of any difference in ground voltage between the first location and the second location. The control circuit is configured to control the output of the power supply in response to the detected voltage provided by the voltage monitor circuit. One exemplary embodiment of such a power supply is illustrated in FIG. 1 and indicated generally by reference numeral 100.

As shown in FIG. 1, the power supply 100 includes a power source 102, a control circuit 104 coupled to a local ground 106, an output terminal 108 having an output voltage Vo relative to a local ground 110, and a voltage monitor circuit 112. In this particular embodiment, the voltage monitor circuit 112 is configured to detect the output voltage Vo at the output terminal 108, and to provide the detected output voltage Vo to the control circuit 104 independent of any voltage difference between the local ground 106 and the local ground 110. The control circuit 104 is configured to control the output voltage Vo and/or an output current Io in response to the detected output voltage Vo provided by the voltage monitor circuit 112

The power source 102 can be any suitable power source including, for example, a current source, a voltage source, etc. While not shown in FIG. 1, it should be understood that during use of the power supply 100, a load is normally connected between the output terminal 108 and the local ground 110. Further, while the voltage monitor circuit 112 is illustrated in FIG. 1 as monitoring the output voltage Vo, it should be understood that the voltage monitor circuit can be configured to monitor another voltage of interest and accurately provide such other voltage of interest to the control circuit 104 notwithstanding any ground voltage variations.

Figure 2:
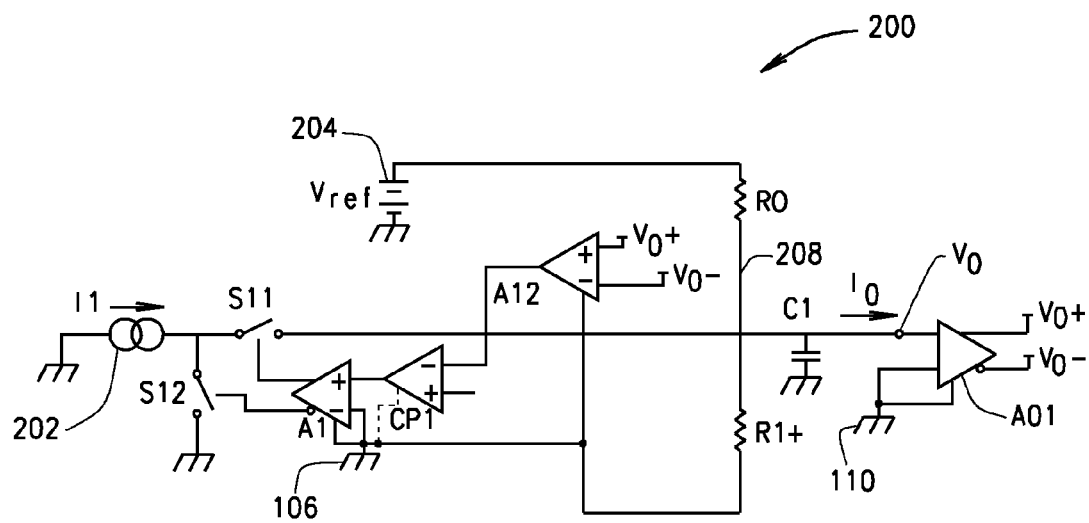
FIG. 2 is a circuit diagram of one exemplary implementation of the power supply of FIG. 1.

FIG. 2 illustrates an exemplary circuit implementation 200 for the power supply 100 of FIG. 1. As shown in FIG. 2, the circuit 200 includes a current source 202 corresponding to the power source 102 of FIG. 1. The circuit 200 further includes a comparator CP1, a differential amplifier A1, and two switches S11, S12 which together comprise the control circuit 104 of FIG. 1. Additionally, the circuit 200 includes two differential amplifiers A01, A12 which, in this particular implementation, comprise the voltage monitor circuit 112 of FIG. 1. Preferably, differential amplifiers A1, A12 and comparator CP1 are each coupled to the same ground point, such as local ground 106.

As shown in FIG. 2, differential amplifier A01 is coupled to local ground 110 and is configured for converting the output voltage Vo detected relative to the local ground 110 into a pair of voltages. Differential amplifier A12 is configured for converting this pair of voltages into a single-ended voltage, relative to the local ground 106, which represents the detected output voltage Vo. In this manner, the output voltage Vo (or another voltage of interest) can be detected at the output terminal 108 and accurately provided to the control circuit relative to the local ground 106, even when there are voltage variations between the local ground 106 and the local ground 110.

In the implementation shown in FIG. 2, the pair of voltages Vo+/Vo− generated by the differential amplifier A01 constitute a differential voltage pair. It should be understood, however, that the pair of voltages need not be a differential voltage pair of equal but opposite voltage levels. On the contrary, the pair of voltages generated by the differential amplifier A01 need only represent the voltage difference between the output terminal 108 and the local ground 110, and the output of the differential amplifier A12 need only represent the difference between the pair of voltages generated by the differential amplifier A01, in order for the voltage monitor circuit 112 to accurately provide the detected output voltage Vo (or another voltage of interest) to the comparator CP1.

Also shown in FIG. 2 is a reference voltage source Vref and a pair of resistors R0, R1 for providing a reference voltage Vref1 to the comparator CP1. The comparator CP1 and differential amplifier A1 are configured to selectively couple current from the current source 202 to the output terminal 108, via switches S11, S12, in response to the detected output voltage V0 provided by the differential amplifier A12 and the reference voltage Vref1.

While the exemplary circuit 200 of FIG. 2 is a switched current power converter, it should be understood that the teachings of the present invention apply to other types of power supplies employing voltage feedback control.

Figure 3:
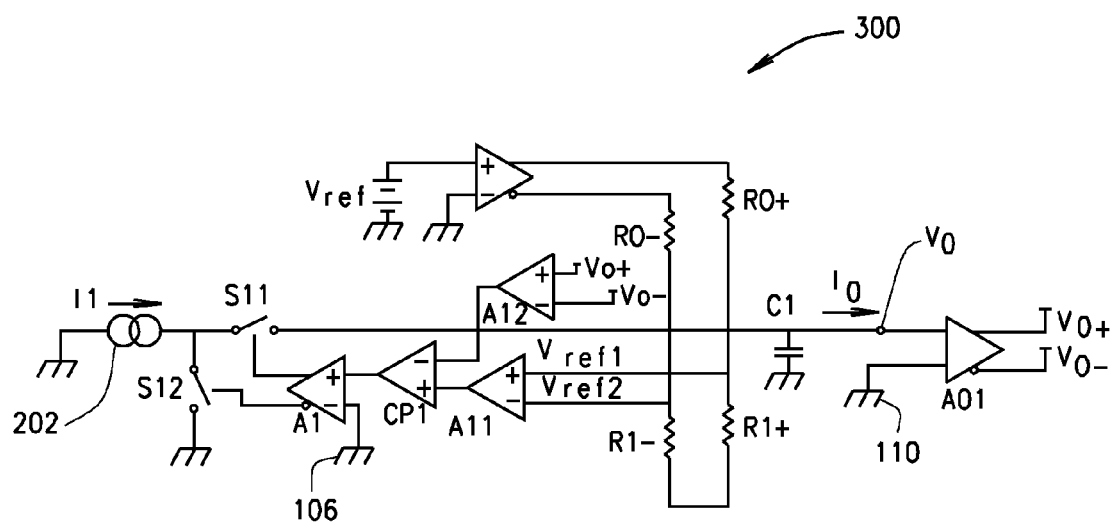
FIG. 3 is a circuit diagram of a switched current power converter according to another exemplary embodiment of the invention.

FIG. 3 illustrates a switched current power converter according to another exemplary embodiment of the present invention. The circuit 300 of FIG. 3 is similar to the circuit 200 of FIG. 2 except that in the circuit 300 of FIG. 3, two reference voltages Vref1, Vref2 are generated by an ungrounded reference voltage generator and provided to a differential amplifier A11 having an output connected to the comparator CP1. In this manner, the reference voltage provided to the comparator CP1 (which represents the difference between Vref1 and Vref2) is isolated from any variations in ground voltage. Although not shown in FIG. 3, differential amplifiers A1, A11, A12 and comparator CP1 are preferably coupled to the same ground point, such as local ground 106.

Figure 4:
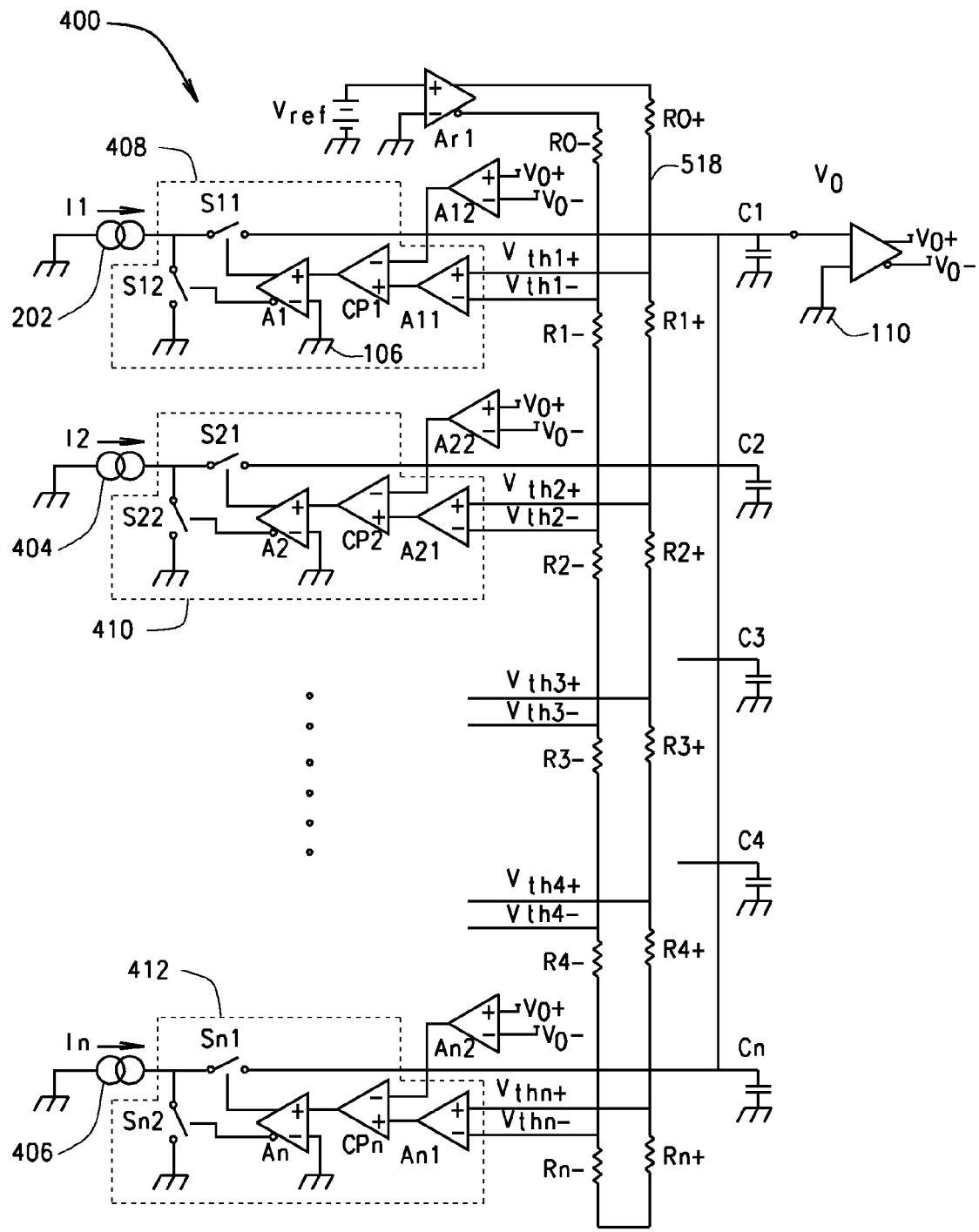
FIG. 4 is a circuit diagram of a switched current power converter employing multiple current sources according to another exemplary embodiment of the invention.

FIG. 4 illustrates a switched current power converter according to another exemplary embodiment of the present invention. The circuit 400 of FIG. 4 is similar to the circuit 300 of FIG. 3 except that in the circuit 400 of FIG. 4, multiple current sources 202, 404, . . . , 406 are provided, with each current source having an associated control circuit 408, 410, . . . , 412. Each control circuit receives a pair of reference voltages Vth1+Nth1−, Vth2+Nth2−, . . . , Vthn+/Vthn− from an ungrounded voltage reference generator. Additionally, in the embodiment of FIG. 4, the voltage monitor circuit includes, as in the exemplary embodiments described above, the differential amplifier A01 for generating a differential voltage pair Vo+/Vo− representing the detected output voltage Vo relative to local ground 110. Additionally, the voltage monitor circuit of FIG. 4 includes multiple differential amplifiers A12, A22, . . . , An2 each coupled to a different one of the control circuits 408, 410, . . . , 412 for converting the differential voltage pair Vo+/Vo− produced by differential amplifier A01 to a single-ended voltage representing the detected output voltage Vo. Although not shown in FIG. 4, the differential amplifiers and comparator of each control circuit, as well as their associated differential amplifier A12, A22, . . . , An2, are preferably coupled to the same local ground point (i.e., a different local ground point for each control circuit).

Additional details regarding the circuits of FIGS. 3 and 4 are described in copending U.S. application Ser. No. 11/060,230 filed Feb. 17, 2005, the entire disclosure of which is incorporated herein by reference.

When describing elements or features of the present invention or embodiments thereof, the articles "a", "an", "the" and "said" are intended to mean there are one or more of such elements or features. The terms "comprising", "including" and "having" are intended to be inclusive and mean there may be additional elements or features beyond those specifically described.

Those skilled in the art will recognize that various changes can be made to the exemplary embodiments and implementations described above without departing from the scope of the present invention. Accordingly, all matter contained in the above description or shown in the accompanying drawings should be interpreted as illustrative and not in a limiting sense.

What is claimed is:

1. A power supply comprising a control circuit for controlling an output of the power supply and a voltage monitor circuit for detecting a voltage at a first location and providing the detected voltage to a second location in the control circuit independent of any difference between a ground voltage at the first location and a ground voltage at the second location, the first location being spaced apart from the second location, the voltage monitor circuit including a first differential amplifier coupled to ground at the first location for generating a differential voltage pair representing the detected voltage and a second differential amplifier coupled to ground at the second location for converting the differential voltage pair into a single-ended voltage representing the detected voltage, the control circuit configured to control the output of the power supply in response to the single-ended voltage provided by the voltage monitor circuit.

2. The power supply of claim 1 wherein the voltage monitor circuit is configured for detecting the voltage at the first location as a single-ended voltage, and converting the detected single-ended voltage into the differential voltage pair.

3. The power supply of claim 1 wherein the control circuit is coupled to ground at the second location.

4. The power supply of claim 1 wherein the control circuit is configured to control the output of the power supply in response to at least one reference voltage and the single-ended voltage provided by the voltage monitor circuit.

5. The power supply of claim 1 wherein the power supply is a switched current power converter having at least one source of current, and the control circuit is configured to selectively couple the current to the output in response to the single-ended voltage provided by the voltage monitor circuit.

6. A switched current power converter comprising at least one source of current, an output, a control circuit, and a voltage monitor circuit for detecting a voltage at the output at a first location and providing the detected output voltage to the control circuit at a second location spaced apart from the first location independent of any difference between a around voltage at the first location and a ground voltage at a second location, the voltage monitor circuit including a first differential amplifier coupled to ground at the output for generating a differential output voltage pair representing the detected output voltage and a second differential amplifier coupled to ground at the control circuit for converting the differential output voltage pair to a single-ended voltage representing the detected output voltage, the control circuit configured to selectively couple the current to the output as a function of the single-ended voltage provided by the voltage monitor circuit.

7. The switched current power converter of claim 6 wherein the converter includes a plurality of control circuits, and wherein the voltage monitor circuit includes a plurality of second differential amplifiers each coupled to ground at a different one of the control circuits for converting the differential output voltage pair to a single-ended voltage representing the detected output voltage.

8. The switched current power converter of claim 7 wherein the converter includes a plurality of current sources each associated with a different one of the control circuits, and wherein each control circuit is configured to selectively couple current from its associated current source to the output in response to the single-ended voltage produced by its associated second differential amplifier.

9. The switched current power converter of claim 6 wherein the control circuit is configured to selectively couple the current to the output as a function of at least one reference voltage and the single-ended output voltage provided by the voltage monitor circuit.

10. The switched current power converter of claim 9 wherein the control circuit includes a comparator coupled to receive the single-ended output voltage and the at least one reference voltage, and wherein the control circuit is configured to selectively couple the current to the output when a difference between the single-ended output voltage and the at least one reference voltage is greater than a predetermined value.

11. The switched current power converter of claim 6 wherein the control circuit includes at least one switch for selectively coupling the current to the output.

12. The switched current power converter of claim 6 wherein the source of current is a constant current source.

13. A power supply comprising control means for selectively coupling current to an output of the power supply and voltage monitoring means for detecting a voltage at an output of the power supply and providing the detected output voltage to the control means at a location spaced apart from the output independent of any difference between a around voltage at the output and a ground voltage at the control means location, the voltage monitoring means including a first differential amplifier for converting the detected output voltage to a differential output voltage pair and a second differential amplifier for converting the differential output voltage pair into a single-ended voltage representing the detected output voltage, the control means coupling current to the output as a function of the single-ended voltage.

14. The power supply of claim 13 wherein the first differential amplifier is coupled to ground at the output and the second differential amplifier is coupled to ground at the control means.

15. A power supply comprising a control circuit for controlling an output of the power supply and a voltage monitor circuit for detecting a voltage at a first location and providing the detected voltage to a second location in the control circuit independent of any difference between a around voltage at the first location and a ground voltage at the second location, the first location being spaced apart from the second location, the voltage monitor circuit including a first differential amplifier coupled to ground at the first location for generating a pair of voltages representing the detected voltage and a second differential amplifier coupled to ground at the second location for converting the pair of voltages into a single-ended voltage representing the detected voltage, the control circuit configured to control the output of the power supply in response to the single-ended voltage provided by the voltage monitor circuit.

* * * * *

UNITED STATES PATENT AND TRADEMARK OFFICE
CERTIFICATE OF CORRECTION

PATENT NO. : 7,589,505 B2  Page 1 of 1
APPLICATION NO. : 11/152847
DATED : September 15, 2009
INVENTOR(S) : Cheng It is certified that error appears in the above-identified patent and that said Letters Patent is hereby corrected as shown below:

In claim 6, line 1, replace "a around" with "a ground".

In claim 13, line 11, replace "a around" with "a ground".

In claim 15, line 28, replace "a around" with "a ground".

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,589,505 B2
APPLICATION NO. : 11/152847
DATED : September 15, 2009
INVENTOR(S) : Cheng It is certified that error appears in the above-identified patent and that said Letters Patent is hereby corrected as shown below:

Column 5, in claim 6, line 1, replace "a around" with "a ground".

Column 6, in claim 13, line 11, replace "a around" with "a ground".

Column 6, in claim 15, line 28, replace "a around" with "a ground".

This certificate supersedes the Certificate of Correction issued November 17, 2009.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,589,505 B2
APPLICATION NO. : 11/152847
DATED : September 15, 2009
INVENTOR(S) : Wing Ling Cheng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this

Twenty-first Day of September, 2010

David J. Kappos
*Director of the United States Patent and Trademark Office*